United States Patent [19]

Lombardo et al.

[11] Patent Number: 5,312,640
[45] Date of Patent: May 17, 1994

[54] REDUCTION OF CHOLESTEROL IN EGG YOLK BY THE ADDITION OF EITHER ACID OR BOTH SALT AND ACID

[75] Inventors: Stephen P. Lombardo, Grayslake; Mark Kijowski, Chicago, both of Ill.

[73] Assignee: Kraft General Foods, Inc., Northfield, Ill.

[21] Appl. No.: 108,178

[22] Filed: Aug. 17, 1993

Related U.S. Application Data

[63] Continuation of Ser. No. 873,704, Apr. 22, 1992, abandoned, Continuation-in-part of Ser. No. 839,585, Feb. 21, 1992, abandoned.

[51] Int. Cl.$^5$ .............................. A23L 1/015
[52] U.S. Cl. ..................... 426/614; 426/422; 426/429; 426/431; 426/480; 426/490
[58] Field of Search ............ 426/614, 417, 480, 490, 426/422, 424, 425, 429, 431, 442

[56] References Cited

U.S. PATENT DOCUMENTS

| | | | |
|---|---|---|---|
| 3,563,765 | 2/1971 | Melnick | 99/113 |
| 3,594,183 | 6/1971 | Melnick et al. | 99/94 |
| 3,717,474 | 2/1973 | Fioriti et al. | 99/113 |
| 3,881,034 | 4/1975 | Levin | 426/541 |
| 4,103,040 | 7/1978 | Fioriti et al. | 426/614 |
| 4,104,286 | 8/1978 | Fallis et al. | 260/397.25 |
| 4,234,619 | 11/1980 | Yano et al. | 426/614 |
| 4,296,134 | 10/1981 | Boldt | 426/250 |
| 4,333,959 | 6/1982 | Bracco et al. | 426/614 |
| 4,804,555 | 2/1989 | Marschner et al. | 426/601 |
| 4,882,193 | 11/1989 | Carrott | 426/614 |
| 4,971,827 | 11/1990 | Huang | 426/614 |
| 5,091,203 | 2/1992 | Conte, Jr. et al. | 426/614 |

FOREIGN PATENT DOCUMENTS

| | | | |
|---|---|---|---|
| 63-109757 | 5/1988 | Japan | A23L 1/32 |
| 2238456A | 6/1991 | United Kingdom | A23L 1/32 |

OTHER PUBLICATIONS

Larson & Froning "Extraction and Processing of Various Components from Egg Yolk" 60 *Poultry Science* 160-167 (1980).

*Primary Examiner*—Donald E. Czaja
*Assistant Examiner*—Anthony J. Weier
*Attorney, Agent, or Firm*—Fitch, Even, Tabin & Flannery

[57] ABSTRACT

The method generally comprises removing cholesterol from egg yolk by combining both/or either a food grade acid and salt with water and oil to form a blend. This blend is combined with egg yolk to form a mixture, wherein the ratio of oil to yolk is in the range of between about 2.4:1 to about 1:1, and the ratio between water:salt:food grade acid is in the range of between about 0.30:0.14:0.003 to about 0.70:0.45:0.056, based upon the weight of the unsalted egg yolk. The mixture is sheared and centrifuged to separate the mixture into a first and a second stream, wherein the first stream contains the egg yolk and water and the second stream contains the cholesterol and oil.

32 Claims, 2 Drawing Sheets

REDUCTION OF CHOLESTEROL IN EGG YOLK BY THE ADDITION OF EITHER ACID OR BOTH SALT AND ACID

This application is a continuation of application Ser. No. 873,704 filed Apr. 22, 1992 now abandoned which is a continuation-in-part of applicaton Ser. No. 07/839,585 filed Feb. 21, 1992 now abandoned.

FIELD OF THE INVENTION

The invention relates to a method of decholesterolizing egg yolks by combining either a food grade acid or salt, or both, water and oil with egg yolk in a ratio of between about 2.4:1 to about 1:1 oil to yolk and about 0.30:0.14:0.003 to about 0.70:0.45:0.056 water:salt:food grade acid, based upon the weight of the unsalted egg yolk.

BACKGROUND OF THE INVENTION

Eggs are nutritious, but are also very high in cholesterol. The cholesterol content is approximately 1.4 percent of the egg yolk weight. Furthermore, about one-third of the yolk weight is fat. Fatty acid analysis shows that the fat content of an average yolk is 35.4 percent saturated fat (principally palmitic and stearic acids), 49.1 percent monounsaturated fat (oleic acid), and 15.5 percent polyunsaturated fat (linoleic acid). Thus, the ratio of polyunsaturated fat to saturated fat is less than 1 to 2, which is an undesirable balance.

Substantial research efforts have been directed to the removal of cholesterol from egg yolks as well as food products containing egg yolks. A variety of approaches to remove cholesterol from egg yolks have been tried. One approach utilizes microorganisms to enzymatically oxidize and degrade cholesterol [Japanese Patent 60-18375], but this method produces cholesterol oxidation products which may be undesirable. Organic solvents have also been used to extract cholesterol [JP 48/44458, U.S. Pat. Nos. 4,104,286, 3,881,034, 3,563,765, 4,234,619 and Tokarska, et al., Can. Inst. Food Sci. Tech. J. 18:256–258 (1985)], but such methods remove a substantial portion of the triglyceride oils, and may involve significant processing steps to remove solvents. Even with supercritical carbon dioxide as the solvent, selectivity of cholesterol over triglycerides may be limited [Prepared Foods, 157:186 (1988); JP 59/135847].

U.S. Pat. No. 4,804,555 discloses a process for the simultaneous deodorization and cholesterol level reduction of fish oils. The fish oil is deaerated, mixed with steam, heated, flash vaporized, thin film-stripped with a countercurrent stream and cooled. U.S. Pat. No. 2,234,619 discloses a method for cholesterol removal from eggs by dehydrating the eggs, extracting the cholesterol with liquid dimethyl ether under anhydrous conditions and removing the dimethyl ether by treatment under reduced pressure at low temperatures. U.S. Pat. No. 4,104,286 describes the isolation of cholesterol from eggs through extraction with ethanol, saponification in an aqueous ethanolic alkali metal hydroxide and concentration and purification with a hydrocarbon solvent and methanol. U.S. Pat. No. 4,393,044 describes the formation of a steroid ester to be used as an oil phase material or base material for cosmetics or ointments.

Edible vegetable oils have also been used to extract cholesterol from egg yolks, as described in U.S. Pat. Nos. 3,717,414 and 4,103,040. However, such extraction using a vegetable oil to remove the cholesterol from yolk produces a waste stream of spent oil. In order to make this an economical process, further development is necessary to form a process for regenerating, rather than disposing this spent oil.

Another method of extracting cholesterol from eggs is disclosed in U.S. Pat. No. 4,333,959. The cholesterol is removed from the egg yolk by adding to the egg yolk an acid to reduce the pH of the egg yolk and then treating the egg yolk with an edible oil at a ratio of 3:5 oil to yolk to form a dispersion. The dispersion is centrifuged to form an egg-yolk phase and an oil phase. This method does not alleviate the problem of reducing the amount of oil necessary to extract the cholesterol; therefore, a considerable amount of oil is still necessary to extract the cholesterol, which thereby creates a problem of having to regenerate the oil containing the cholesterol.

Prior to this invention herein, a limiting factor in reducing the amount of oil was that emulsions were formed. For instance, even when the ratio of oil to egg yolk was 2:1, upon shearing the extraction mixture, oil-in-water emulsions were observed. Therefore, it would be highly desirable to limit the formation of an oil-in-water emulsion, while decreasing the amount of oil necessary for the extraction. It would also be desirable to provide egg products having desirable functional characteristics of egg yolk products (e.g., protein and phospholipids), while reducing the cholesterol level, increasing the polyunsaturated fat to saturated fat ratio, while reducing the amount of oil necessary to remove a substantial amount of the cholesterol. It would further be desirable to do this while retaining the functionality, appearance and taste of natural eggs which would yield good texture upon being cooked and the like.

SUMMARY OF THE INVENTION

The method generally comprises removing cholesterol from egg yolk by combining in particular ratios either a food grade acid or salt, or both, water and oil with egg yolk to form a mixture. The mixture is sheared and centrifuged to separate the mixture into a first and a second stream, wherein the first stream contains the egg yolk and water, and the second stream contains the cholesterol and oil. During this shearing, the cholesterol is extracted from the fat of the egg yolk to the oil phase. The economic feasibility of this is basically dependent upon the ability to reduce the quantity of oil needed for the extraction.

The ratio of oil to yolk is between about 2.4:1 to about 1:1. The ratio of ingredients if a food grade acid and salt are both used is between about 2.4:1 to about 1:1 oil to yolk and between about 0.30:0.14:0.003 to about 0.70:0.45:0.056 water:salt:food grade acid, preferably in a ratio of between about 0.35:0.19:0.004 to about 0.60:0.29:0.011 water:salt:food grade acid, based on the weight of the unsalted egg yolk. If a food grade acid is not used, the oil to yolk ratio is still between about 2.4:1 to about 1:1 and the ratio of water:salt is between about 0.30:0.14 to about 0.70:0.40, water:salt. If only a food grade acid is used, the ratio of oil to yolk is between about 2.4:1 to about 1:1 and the ratio of water:food grade acid is between about 0.30:0.003 to about 0.70:0.040. The amount of cholesterol extracted is generally between about 70 to about 80 percent, based on the weight percent of cholesterol in the egg yolks.

Typically, in order to reduce the amount of oil, a food grade acid or salt, or both, is combined with water and oil to form a blend. This blend is combined with the egg yolk to form a mixture. Alternatively, the salt can be combined with the egg yolk. The acid is added to prevent an oil-in-water emulsion from forming when the blend is added to the yolk. When the mixture does contain an acid, it is thought that an oil-in-water emulsion does not form because salt and/or acid facilitates the rapid coalescence of oil droplets as they are sheared into smaller size particles by the mixer. When an oil-in-water emulsion is formed it is extremely difficult, or almost impossible, to separate. The formation of an emulsion would significantly inhibit the extraction of cholesterol.

Thus, by practicing the invention it is possible to substantially reduce the amount of oil necessary to extract the cholesterol from the egg yolks by increasing the water content of the yolk, yet still avoiding a oil-in-water emulsion. Even though the amount of oil is reduced, typically between about 30 to about 62 percent, the amount of cholesterol extracted is between about 70 to about 80 weight percent. This reduction in oil represents a substantially economic savings. Because less oil is used than in previous processes, large scale commercial applications are now possible without unduly burdening the consumer with the higher costs of production, which was previously experienced prior to this invention.

DETAILED DESCRIPTION

The method generally comprises removing cholesterol from egg yolk by combining either a food grade acid or salt or both with water, oil, and egg yolk. The ingredients can be combined in any order so long as if a food grade acid is used, the food grade acid is first combined with the oil, or the food grade acid can be combined with the water and/or salt and then the oil to form a blend. The blend is added to the egg yolk to form a mixture. Preferably, the food grade acid is mixed with water and salt, then combined with pre-heated oil to form a blend. The egg yolk is added to the blend. If a food grade acid is not used, it is preferred to combine the ingredients by forming saltwater and combining the saltwater with the egg yolk to form a blend, and this blend is added to the preheated oil to form a mixture. Of course, the ingredients can be combined in any order so long as the food grade acid is not added directly to the egg yolk. The mixture is sheared and centrifuged to separate the mixture into a first and a second stream, wherein the first stream contains the egg yolk and water and the second stream contains the cholesterol and oil. In the first stream, the water can be evaporated off, or the stream can be mixed with concentrated egg whites. The resulting product would either be an egg yolk product with about the same water concentration as natural egg yolk, or if the egg yolk is mixed with concentrated egg whites, the resulting product would be substantially the same as whole eggs. An alternative to the method described above is to add the salt to the egg yolk or the oil, instead of to the water, but if a food grade acid is used, with or without salt, it should be added to the oil prior to contact with the egg yolk.

This invention is not limited to treating fresh eggs; therefore, frozen eggs, salted egg yolks, and dried yolks may also be decholesterolized using the techniques disclosed herein. If dried egg yolks are treated, they should be hydrated prior to treatment. Typically, dried egg yolks are hydrated with between about 50% to about 52% water. By "salted egg yolk" it is meant that the egg yolk contains a small amount of salt. The salted form of the egg yolk is preferably used. The salted egg yolk typically contains between about 8 to about 10 percent salt based on the weight percent of the egg yolk. The salt added and specified in the ratios herein is in addition to the salt contained in the yolk. However, the invention is not limited to salted egg yolks. Natural egg yolks can also be treated, but the amount of salt added to the mixture should be adjusted. It should also be noted that natural egg yolk contains a small percentage of water and is typically referred to as "wet egg yolks". The amount of water added and used to prepare the mixture is in addition to the natural water content of the yolk.

Although any oil such as cottonseed oil, lard, palm oil, beef tallow, butterfat, coconut oil and the like can be used, oils of particular interest are oils low in cholesterol. Because vegetable oils high in polyunsaturated fat are low in cholesterol, they are of the most interest. Typical vegetable oils could include the following: safflower oil, corn oil, sunflower oil, soybean oil, canola oil, olive oil, peanut oil and the like. Additionally, a blend of these oils could also be used. Most preferably, safflower or soybean oil are used herein.

Any food grade acid can be used so long as the acid has a PH of between about 2 to about 6.8. Typical food grade acids could include, but are not limited to acetic acid, phosphoric acid, ascorbic acid, and the like. More preferably, the food grade acid is acetic acid. It is most preferred to first combine both the food grade acid and the salt with the water, prior to adding the oil.

The ratio of oil to egg yolk if a food grade acid and salt are used is between about 2.4:1 to about 1:1. The ratio of water:salt:food grade acid is between about 0.30:0.14:0.003 to about 0.70:0.45:0.056. Preferably, the ratio is between about 0.35:0.19:0.004 to about 0.60:0.29:0.011 water:salt:food grade acid. The weight ratios herein, unless otherwise specified, are based upon the weight of unsalted egg yolk. If a food grade acid is not used, the ratio of oil to yolk is still between about 2.4:1 to about 1:0, but the ratio of water:salt is between about 0.30:0.14 to about 0.70:0.40 and is preferably between about 0.35:0.19 to about 0.60:0.29 water:salt. Typically, the amount of salt added is between 5 percent to about 25 percent on a yolk/water/salt/basis. Preferably at a 1:1 oil:yolk ratio, the amount of salt added is about 5 percent. If salt is not used, then the ratio of oil to yolk is still between about 2.4:1 to about 1:1, but the ratio of water to food grade acid is between about 0.30:0.003 to about 0.70:0.040 water:food grade acid, preferably about 0.35:0.004 to about 0.60:0.011. If salt is used, then the amount of food grade acid is about 0.3% to about 2.5%, based on a salt/water/yolk/acid basis.

The pH of the mixture is about 5.1 to about 6.4, more preferably the pH is between about 6.0 to about 6.4 when the food acid is used. If salt is also present, then the pH is about 5.5 to about 6.6, preferably about 6 to about 6.6.

Prior to forming the blend, the oil is preferably preheated to a temperature between about 125° F. to about 155° F., more preferably between about 135° F. to about 150° F. and most preferably between about 140° F. to about 145° F. Preferably, the water is combined with either the food grade acid or the salt, or both and is then added to the preheated oil to form the blend. Generally, the ingredients can be combined in any order, with the exception that the food grade acid should not be added directly to the egg yolks.

Typically, after forming the blend, the blend is admixed with the egg yolk to form a mixture. The mixture is sheared. Any shearing device can be used so long as the cumulative shear value is achieved. Generally, any mixer could be used as a shearing device including, but not limited to, high shear mixersdispersing, in-line mixer homogenizers and the like. The shearing device is typically run at about 3000 to about 4000 RPM, preferably between about 3500 to about 3700 RPM, and the mixture is passed through the shearing device about 8 to about 12 equivalent passes, preferably between about 9 to about 10 equivalent passes at a flow rate of 50 lbs./min., with the shear/pass being equal to 7,686 and having a peak shear rate of 26,614 sec.$^{-1}$ at 3600 RPM.

The temperature during shearing is between about between about 135° F. and about 149° F., preferably about 140° F. to about 149° F., more preferred is between about 142° F. and 147° F. and most preferably between about 144° F. to about 146° F.. The temperature is preferably controlled at the inlet temperature prior to shearing. If the mixture does not contain salt, greater efficiencies have been observed as a function of the food grade acid concentration when the temperature of the extraction was at about 147° F. to about 149° F.

Generally, the mixture is sheared at about 3000 to about 4000 RPM, for about 8 to about 12 equivalent passes. More preferably, the mixture is sheared at about 3500 to about 3700 RPM for about 9 to about 10 equivalent passes. Typically, the shear history is about 52,600 to about 125,000 and has a peak shear rate of between about 17,000 to about 30,300 sec.$^{-1}$, more preferably about 61,300 to about 92,200 and has a peak shear rate of between about 25,000 to about 28,100 sec.$^{-1}$. The process can be accomplished by the apparatus illustrated in FIGS. 1, 2, 3 and 4, but should not be limited to such designs.

After shearing, the oil containing cholesterol is easily separated from the mixture by centrifugation into two phases. The first phase contains the egg yolk, water, either the food grade acid or salt or both. The second phase contains oil and cholesterol. The separation is not limited to centrifugation, although centrifugation is the preferred means of separation. Other means of separation could include for example, cyclones, gravity separators, and the like. After separating the oil from the egg yolk dilution, the cholesterol contained in the oil may be removed, typically by steam stripping, molecular distillation or the like. After clean-up, the oil can then be recycled.

Between about 70 to about 82 percent of the cholesterol is efficiently removed from the recovered egg yolk; generally, between about 75 to about 78 percent of the cholesterol is removed. The percent of cholesterol removed from the resulting egg yolk is calculated in the following manner:

$$\frac{\text{Analytical amount of cholesterol in untreated 10\% salted egg yolk}}{\text{Analytical amount of protein in untreated 10\% salted egg yolk}} = \#A$$

$$\frac{\text{Analytical amount of cholesterol in treated 10\% salted egg yolk}}{\text{Analytical amount of protein in treated 10\% salted egg yolk}} = \#B$$

$$\#A - \#B = \#C$$

$$\frac{\#C}{\#A} \times 100 = \text{percent of cholesterol reduction in treated 10\% salted egg yolk.}$$

The resulting decholesterolized egg yolk composition typically comprises between about 65 percent to about 70 percent moisture, about 8 percent to about 10 percent fat, about 10 percent to about 12 percent protein and about 8 percent to about 14 percent salt.

The resulting product has a reduced cholesterol value and can be used like whole eggs, i.e. in baked goods, puddings, desserts such as ice cream, in pasta, egg dishes, such as omelets, viscous products as mayonnaise and the like. The egg product can be a light yellow color, but by adding beta-carotene after processing, the bright yellow color can be restored. More specifically, if the egg yolks are decholesterolized by employing the methods using a food grade acid alone or with the salt, then the resulting product is particularly useful in mayonnaise, salad dressings, and the like. The egg yolks, either recombined with the whites or just the yolk, are used as a replacement for untreated eggs and are used in similar volume amounts as untreated whole eggs.

FIGS. 1, 2, 3 and 4 further illustrate a few of the embodiments of the invention; however, the invention should not be limited to these illustrations. Generally the oil is pre-warmed in a mixing kettle with a scraped surface agitator 100, 201, 10 and 607 where the kettle is jacketed with hot water 101, 205, 15 and 610. The water and either or both the food grade acid and the salt are combined with the heated oil to form a mixture. The mixture is transferred via a pump 109, 207, 20 and 618 to a high shear mixer/homogenizer 114, 210, 22 and 630. The temperature of the mixture in the mixer is controlled by a cold water jacket 112, 212 outside the mixer. The mixture is recycled 117, 223, 28 and 660 to the kettle 100, 201, 10, and 607 where another cycle begins. The temperature is monitored by thermocouples 105, 116, 222, 224, 230, 30, 32, 34, 36, 659, 657 and 655. These cycles are repeated until the desired shear history is attained.

Figure 3:
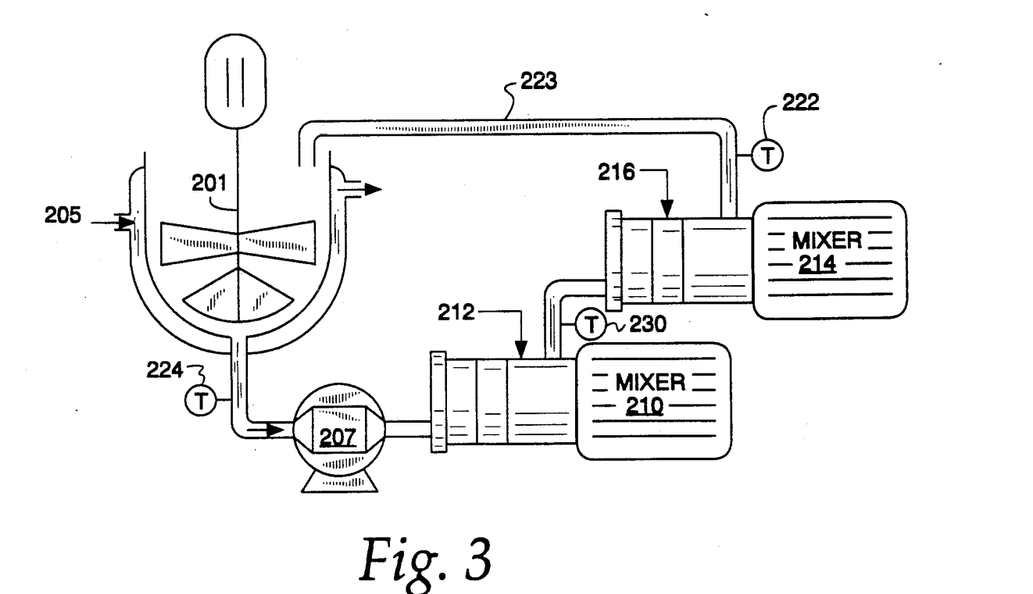
FIG. 3 is a schematic diagram illustrating a specific embodiment of a batch method of shearing the extraction mixture, where two shearing mixers are used.
Figure 4:
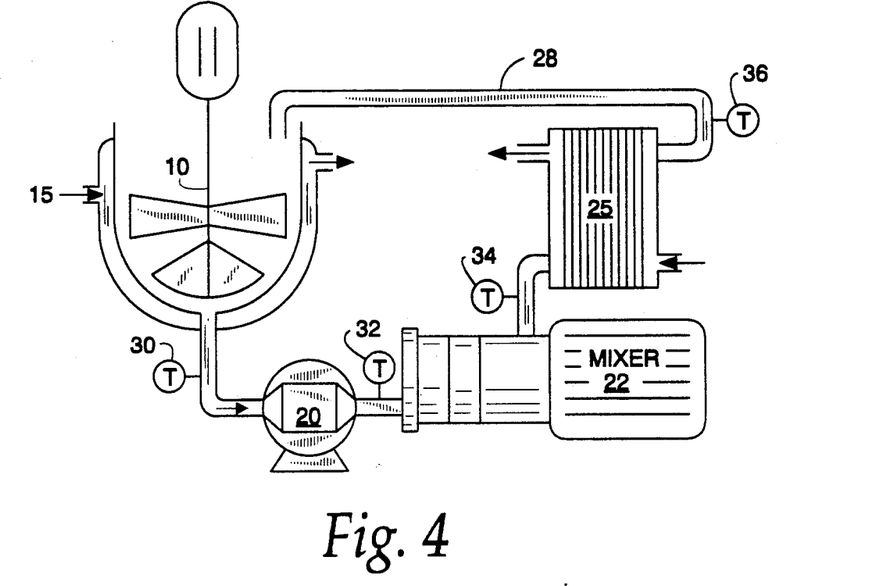
FIG. 4 is a schematic diagram illustrating a specific embodiment of a batch method of shearing the extraction mixture, where a heat exchanger is used to control the outlet temperature during shearing.

The process can be further modified, see FIG. 3, where, instead of recycling after shearing in the mixer 210, the mixture is cycled into second mixer 214 that is cooled with a second cold water jacket 216. Another modification to this process would be to add more mixers or to use a mixer that does not require a pump. Instead of using water jackets to control the temperature, see FIG. 4, a heat exchanger 25 at the mixer outlet can be used to control the temperature of the mixture after shearing, or, as in FIG. 1, a heat exchanger 620 at the mixer inlet could be used to control the temperature of the mixture prior to shearing. Many variations to these schematic diagrams could be used depending upon the desired needs of the user.

The following examples are illustrations of several embodiments, but are not meant to limit or narrow the scope of the invention.

EXAMPLES

Example 1 water+salt, then add 10% salted yolk, then add oil; at a ratio of 1.67:1:0.37:0.29 of oil:yolk:water:salt, where the ratio was based upon unsalted egg yolk.

45 lbs. of soybean oil were placed into a jacketed tank and was preheated to a temperature of 145° F. To increase the heating rate, the oil was preheated with a Pentax mixer running at 3600 RPM. While preheating the oil, 4.7 lbs. of salt were dissolved in 10 lbs. of water. The saltwater was added to 30 lbs. of egg yolk and then mixed together. At 145° F., the Pentax mixer was stopped and the diluted egg yolk was added to the preheated soybean oil. The mixture was circulated at 50 lbs./min. through a process system shown in FIG. 1. The Pentax mixer was cooled through a heat exchanger to maintain the thermocouple 655 between 147° F. and 149° F. The mixer was operated at 3600 RPM and the system operated for 18 min., or the equivalent of 10 equivalent passes. The egg/water was separated from the oil by pumping the sheared mixture through a centrifuge at 8 lbs./min. The cumulative shear history was 76,900 and the peak shear rate was 26,600 sec.$^{-1}$. The percent cholesterol removed: 79.0% based on percent removed from egg yolk.

TABLE 1

| Time (min.) | TEMPERATURE HISTORY | | |
|---|---|---|---|
| | 659* (°F.) | 657* (°F.) | 655* (°F.) |
| 0 | 115 | 127 | 125 |
| 5 | 132 | 130 | 142 |
| 10 | 140 | 131 | 147 |
| 15 | 141 | 132 | 147 |
| 18 | 142 | 133 | 148 |

Figure 1:
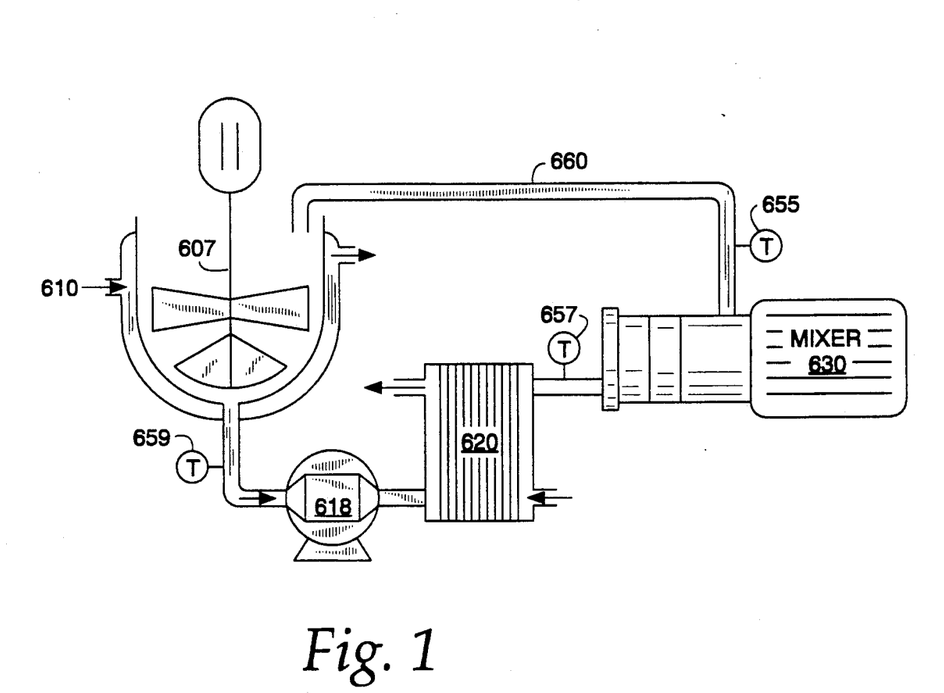
FIG. 1 is a schematic diagram illustrating a specific embodiment of a batch method of shearing the extraction mixture, whereas a heat exchange is used to control the inlet temperature during shearing.
Figure 2:
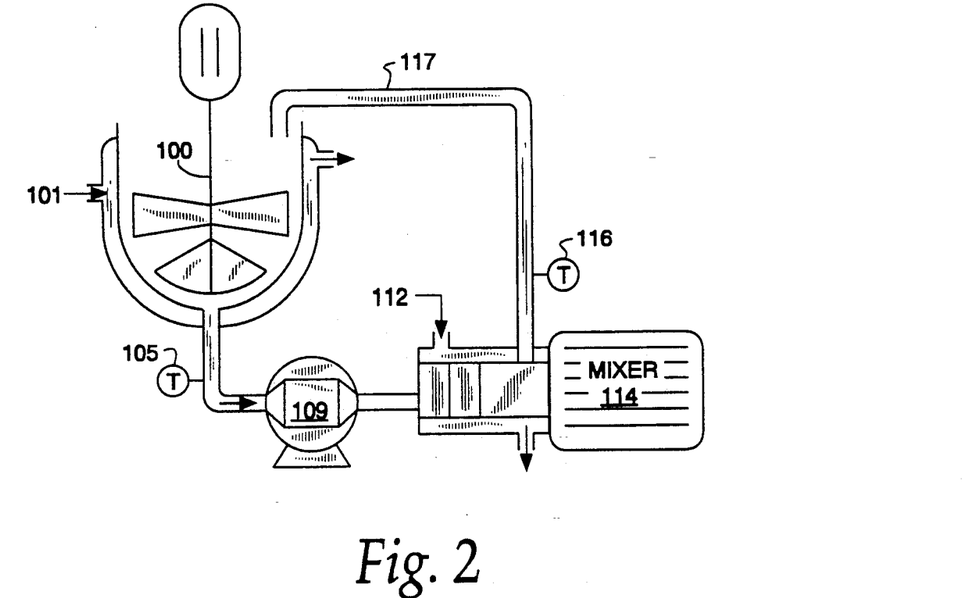
FIG. 2 is a schematic diagram illustrating a specific embodiment of a batch method of shearing the extraction mixture.

*659, 657, 655 are the thermocouples illustrated in FIG. 1.

EXAMPLE 2 water+salt+vinegar, which is then added to the oil, then add 10% salted yolk; at a ratio of 1.67:1:0.37:0.29:0.037 of oil:yolk:water:salt:vinegar, where the ratio was based upon unsalted egg yolk.

45 lbs. of soybean oil were placed into a jacketed tank. 4.7 lbs. of salt were dissolved in 10 lbs. of water. 1 lb. of vinegar was mixed into the saltwater to form vinegar-saltwater. The vinegar-saltwater was added to the jacketed tank. The mixture was preheated until the thermocouple reached 145° F. To increase the heating rate, the oil was preheated with a Pentax mixer running at 3600 RPM. At 145° F., the Pentax mixer was stopped and 30 lbs. of egg yolk were added to the preheated soybean oil. The mixture was circulated at 50 lbs./min. through a process system shown in FIG. 1. The Pentax mixer was cooled through a heat exchanger to maintain the thermocouple 655 between 147° F. and 149° F. The mixer was operated at 3600 RPM and the system operated for 18 min. or the equivalent of 10 passes. The egg/water was separated from the oil by pumping the sheared mixture through a centrifuge at 8 lbs./min. The cumulative shear history was 76,900 and the peak shear rate was 26,600 sec$^{-1}$. The percent cholesterol removed: 81.4% based on percent removed from egg yolk. The addition of a food grade acid with salt does not form an oil-in-water emulsion.

TABLE 2

| Time (min.) | TEMPERATURE HISTORY | | |
|---|---|---|---|
| | 659* (°F.) | 657* (°F.) | 655* (°F.) |
| 0 | 125 | 118 | 123 |
| 5 | 140 | 136 | 149 |
| 10 | 143 | 133 | 147 |
| 15 | 144 | 133 | 148 |
| 18 | 144 | 132 | 148 |

*659, 657, 655 are further illustrated in FIG. 1.

EXAMPLE 3 water+vinegar, then add 10% salted egg yolk, then add oil; at a ratio of 1.67:1:0.37:0.037 of oil:yolk:water:vinegar, where the ratio was based upon unsalted egg yolk.

45 lbs. of soybean oil were placed into a jacketed tank and were preheated to a temperature of 145° F. To increase the heating rate, the oil was preheated with a Pentax mixer running at 3600 RPM. While preheating the oil, 1 lb. of vinegar was dissolved in 10 lbs. of water. The vinegar water was added to the soybean oil and then mixed together. At 145° F., the Pentax mixer was stopped and the egg yolk was added to the preheated soybean oil/vinegar/water blend. The mixture was circulated at 50 lbs./min. through a process system shown in FIG. 1. The Pentax mixer was cooled through a heat exchanger to maintain the thermocouple 655 between 147° F. and 149° F. The mixer was operated at 3600 RPM and the system operated for 18 min. or the equivalent of 10 passes. The egg/water was separated from the oil by pumping the sheared mixture through a centrifuge at 8 lbs./min. The cumulative shear history was 76,900 and the shear rate was 26,000 sec.$^{-1}$. The percent cholesterol removed: 76% based on percent removed from egg yolk. The amount of oil can be reduced, and cholesterol extraction was possible without the formation of an oil-in-water emulsion.

EXAMPLE 4 water+salt+vinegar, then add oil, then add 10% salted egg yolk; at a ratio of 1.1:1:0.37::0.29:0.037 of oil:yolk:water:salt:vinegar, where the ratio was based upon unsalted egg yolk.

30 lbs. of soybean oil were placed into a jacketed tank. 4.7 lbs. of salt were dissolved in 10 lbs. of water. 1 lb. of vinegar was mixed into the saltwater to form vinegar-saltwater. This vinegar-saltwater added to the jacketed tank. The mixture was heated until the thermocouple 659 reached 145° F. To increase the rate of heating, the oil was preheated with a Pentax mixer running at 3600 RPM. At 145° F., the Pentax mixer was stopped and the 30 lbs. of egg yolk were added to the preheated soybean oil. The mixture was circulated at 50 lbs./min. through a process system shown in FIG. 1. The Pentax mixer was cooled through a heat exchanger to maintain the thermocouple 655 between 147° F. and 149° F. The mixer was operated at 3600 RPM and the system operated for 18 min. or the equivalent of 10 passes. The egg/water was separated from the oil by pumping the sheared mixture through a centrifuge at 8 lbs./min. The cumulative shear history was 76,900 and the peak shear rate was 26,600 sec.$^{-1}$. The percent cholesterol removed: 76% based on percent removed from egg yolk.

The amount of oil can be reduced, and cholesterol extraction was possible without the formation of an oil-in-water emulsion.

TABLE 3

| Time (min.) | TEMPERATURE HISTORY | | |
|---|---|---|---|
| | 659* (°F.) | 657* (°F.) | 655* (°F.) |
| 0 | 123 | 112 | 122 |
| 5 | 142 | 130 | 149 |
| 10 | 144 | 129 | 148 |
| 15 | 142 | 129 | 146 |

*659, 657 and 655 are further illustrated in FIG. 1.

EXAMPLE 5 water+salt+vinegar+oil, then add 10% salted egg yolk; at a ratio of 1.1:1:0.37:0.19:0.037 of oil:yolk:water:salt:vinegar, where the ratio was based upon unsalted egg yolk.

30 lbs. of soybean oil, 1 lb. of vinegar, 2.1 lbs. of salt, 10 lbs. of water were placed into a jacketed tank. The tank was preheated to a temperature of 145° F. To increase the heating rate, the mixture was preheated with a Pentax mixer running at 3600 RPM. At 145° F., the Pentax mixer was stopped and 30 lbs. of salted egg yolk were added to the preheated soybean oil. The mixture was circulated at 50 lbs./min. through a process system shown in FIG. 1. The Pentax mixer was cooled through a heat exchanger to maintain the thermocouple 655 between 147° F. and 149° F. The mixer was operated at 3600 RPM and the system operated for 14.62 min. or the equivalent of 10 passes. The egg/water was separated from the oil by pumping the sheared mixture through a centrifuge at 8 lbs./min. The cumulative shear history was 76,900 and the shear rate was 26,600 sec.$^{-1}$. The percent cholesterol removed: 77% based on percent removed from egg yolk. The salt was reduced without the formation of an oil-in-water emulsion at an oil to yolk ratio of 1:1; however, when salt is eliminated from the extraction without the presence of a food grade acid, an oil-in-water emulsion is formed.

TABLE 4

| Time (min.) | TEMPERATURE HISTORY | | |
|---|---|---|---|
| | 659* (°F.) | 657* (°F.) | 655* (°F.) |
| 0 | 112 | 119 | 119 |
| 5 | 132 | 140 | 148 |
| 10 | 132 | 142 | 147 |
| 14 | 131 | 142 | 147 |

*659, 657 and 655 are further illustrated in FIG. 1.

EXAMPLE 6 water+vinegar+oil, then add 10% salted yolk; at a ratio of 1.1:1:0.37:0.037 of oil:yolk:water:vinegar, where the ratio was based upon unsalted egg yolk.

30 lbs. of soybean oil, 1 lb. of vinegar, 10 lbs. of water were placed into a jacketed tank. The tank was preheated to a temperature of 145° F. To increase the heating rate, the mixture was preheated with a Pentax mixer running at 3600 RPM. At 145° F., the Pentax mixer was stopped and 30 lbs. of salted egg yolk were added to the preheated soybean oil. The mixture was circulated at 50 lbs./min. through a process system shown in FIG. 1. The Pentax mixer was cooled through a heat exchanger to maintain the thermocouple 655 between 147° F. and 149° F. The mixer was operated at 3600 RPM and the system operated for 14.2 min. or the equivalent of 10 passes. The egg/water was separated from the oil by pumping the sheared mixture through a centrifuge at 8 lbs./min. The cumulative shear history was 76,900 and the peak shear rate was 26,600 sec.$^{-1}$. The percent cholesterol removed: 75% based on percent removed from egg yolk. The addition of a food acid is not dependent upon salt at a 1.1:1 oil to yolk ratio.

TABLE 5

| Time (min.) | TEMPERATURE HISTORY | | |
|---|---|---|---|
| | 659* (°F.) | 657* (°F.) | 655* (°F.) |
| 0 | 119 | 124 | 124 |
| 5 | 131 | 141 | 146 |
| 10 | 133 | 144 | 148 |
| 14 | 132 | 144 | 148 |

*659, 657 and 655 are further illustrated in FIG. 1.

EXAMPLE 7 COMPARATIVE water+yolk added to oil at a ratio of 2.2:1:0.4:0.11 oil:yolk:water:salt, where the ratio was based upon unsalted egg yolk.

7.1 lbs. of water were added to 17.6 lbs. of 10% salted egg yolk to form a water/yolk mixture. 35.3 lbs. of soybean oil were preheated until the temperature reached 120° F. The water/yolk mixture was added to the oil. The experiment was run using a setup as shown in FIG. 3 with the Pentax mixer 210 run at 3500 RPM and the Pentax mixer 214 run at 3150 RPM. The peak shear of the mixers was 17,900/sec. and the shear history was 23120/pass. When the Pentax mixers were started, the mixture formed an oil-in-water emulsion immediately.

EXAMPLE 8 water+salt+vinegar, then add oil, then add 10% unsalted egg yolk; at a ratio of 1.1:1:0.37:0.29:0.037 of oil:yolk:water:salt:vinegar, where the ratio was based on unsalted egg yolk.

30 lbs. of soybean oil, 1 lb. of vinegar, 4.7 lbs. of salt and 10 lbs. of water were placed into a jacketed tank. The tank was preheated to a temperature of 145° F. To increase the heating rate, the mixture was preheated with a Pentax mixer running at 3600 RPM. At 145° F., the Pentax mixer was stopped and 30 lbs. of salted egg yolk were added to the preheated soybean oil. The mixture was circulated at 50 lbs./min. through a process system shown in FIG. 1. The Pentax mixer was cooled through a heat exchanger to maintain the thermocouple 655 between 145° F. and 147° F. The mixer was operated at 3600 RPM and the system operated for 15.14 min. or the equivalent of 10 equivalent passes. The egg/water was separated from the oil by pumping the sheared mixture through a centrifuge at 8 lbs./min. The cumulative shear history was 76,900 and the shear rate was 26,600 sec.$^{-1}$. The percent cholesterol removed: 75.3% based on percent removed from egg yolk.

TABLE 6

| Time (min.) | TEMPERATURE HISTORY | | |
|---|---|---|---|
| | 659* (°F.) | 657* (°F.) | 655* (°F.) |
| 0 | 111 | 121 | 121 |
| 5 | 131 | 141 | 147 |
| 10 | 129 | 142 | 145 |
| 15 | 131 | 143 | 147 |

*659, 657 and 655 are further illustrated in FIG. 1.

EXAMPLE 9 water+salt, then add oil, then add 10% unsalted egg yolk; at a ratio of 1.1:1:0.37:0.19 of oil:yolk:water:salt, where the ratio was based upon unsalted egg yolk.

30 lbs. of soybean oil, 2.1 lbs. of salt and 10 lbs. of water were placed into a jacketed tank. The tank was preheated to a temperature of 145° F.. To increase the heating rate, the mixture was preheated with a Pentax mixer running at 3600 RPM. At 145° F., the Pentax mixer was stopped and 30 lbs. of salted egg yolk were added to the preheated soybean oil. The mixture was circulated at 50 lbs./min. through a process system shown in FIG. 1. The Pentax mixer was cooled through a heat exchanger to maintain the thermocouple 655 between 147° F. and 149° F. The mixer was operated at 3600 RPM and the system operated for 15.14 min. or the equivalent of 10 passes. The egg/water was separated from the oil by pumping the sheared mixture through a centrifuge at 8 lbs./min. The cumulative shear history was 76,900 and the shear rate was 26,600 sec.$^{-1}$. The percent cholesterol removed: 75% based on percent removed from egg yolk. The addition of salt is not dependent upon the addition of vinegar.

TABLE 7

| | TEMPERATURE HISTORY | | |
|---|---|---|---|
| Time (min.) | 659* (°F.) | 657* (°F.) | 655* (°F.) |
| 0 | 120 | 114 | 115 |
| 5 | 131 | 142 | 147 |
| 10 | 130 | 143 | 147 |
| 14 | 133 | 143 | 148 |

*659, 657 and 655 are further illustrated in FIG. 1.

EXAMPLE 10 COMPARATIVE water+10% salted egg yolk, then add oil; at a ratio of 1.1:1:0.37:0.11 of oil:yolk:water:salt, where the ratio was based upon unsalted egg yolk.

30 lbs. of soybean oil were placed into a jacketed tank and were preheated to a temperature of 145° F. To increase the heating rate, the oil was preheated with a Pentax mixer running at 3600 RPM. While preheating the oil, 10 lbs. of water were mixed with 30 lbs. of egg yolk. At 145° F., the Pentax mixer was stopped and the diluted egg yolk was added to the preheated soybean oil. An oil-in-water emulsion was formed immediately when the Pentax mixer was started in the experiment.

EXAMPLE 11 COMPARATIVE

10% salted egg yolk+water, then oil; at a ratio of 1.1:1:0.5:0.11 of oil:yolk:water:salt, where the ratio was based upon unsalted egg yolk.

10 lbs. of water were added to 20 lbs. of 10% salted yolk to form a water/yolk mixture. 30 lbs. of soybean oil were preheated until a temperature of 120° F. was reached. The water/yolk mixture was added to oil. The experiment was run using a setup as shown in FIG. 3 with the Pentax mixer 210 run at 3500 RPM and the Pentax mixer 214 run at 3150 RPM. The peak shear of the mixers was 17,900/sec. and the shear history was 23120/pass. When the Pentax mixers were started, the mixture formed an oil-in-water emulsion immediately.

EXAMPLE 12 water+salt+10% salted egg yolk, then add oil; at a ratio of 1.1:1:0.37:0.19 of oil:yolk:water:salt, where the ratio was based upon unsalted egg yolk.

30 lbs. of soybean oil were placed into a jacketed tank and were preheated to a temperature of 145° F. To increase the heating rate, the oil was preheated with a Pentax mixer running at 3600 RPM. Once the soybean oil reached a temperature of 145° F. the Pentax mixer was stopped, 30 lbs. of salt egg yolk were added to the oil along with 10 lbs. of water and 2.1 lbs. of salt. The salted egg yolk had been prepared by mixing 3 lbs. of salt with 27 lbs. of egg yolk. The mixture was circulated at 50 lbs./min. through a process system shown in FIG. 1. The Pentax mixer was cooled through a heat exchanger to maintain the thermocouple 655 between 140° F. and 142° F. The mixer was operated at 3600 RPM and the system operated for 14.42 min. or the equivalent of 10 passes. The egg/water was separated from the oil by pumping the sheared mixture through a centrifuge at 8 lbs./min. The cumulative shear history was 76,900 and the shear rate was 26,600 sec.$^{-1}$. The percent cholesterol removed: 71.5% based on percent removed from egg yolk. Salt acted independently upon the mixture and an oil-in-water emulsion was not formed at an oil to yolk ratio of 1.1:1.

TABLE 8

| | TEMPERATURE HISTORY | | |
|---|---|---|---|
| Time (min.) | 659* (°F.) | 657* (°F.) | 655* (°F.) |
| 0 | 115 | 124 | 141 |
| 5 | 137 | 124 | 142 |
| 10 | 138 | 123 | 141 |
| 14 | 137 | 121 | 139 |

*659, 657 and 655 are further illustrated in FIG. 1.

EXAMPLE 13 water+vinegar, then add oil, then add the 10% salted egg yolk; at a ratio of 1.1:1:0.37:0.037 of oil:yolk:water:vinegar, where the ratio was based upon the unsalted egg yolk.

30 lbs. of soybean oil were placed into a jacketed tank and were preheated to a temperature of 145° F. To increase the heating rate, the oil was preheated with a Pentax mixer running at 3600 RPM. While preheating the oil, 1 lb. of vinegar was mixed with 10 lbs. of water, to form vinegar water. The vinegar water was added to the oil. At 145° F., the Pentax mixer was stopped and the 30 lbs. of egg yolk was added to the mixture. The mixture was circulated at 50 lbs./min. through a process system shown in FIG. 1. The Pentax mixer was cooled through a heat exchanger to maintain the thermocouple 655 between 140° F. and 142° F. The mixer was operated at 3600 RPM and the system operated for 14.2 min. or the equivalent of 10 passes. The egg/water was separated from the oil by pumping the sheared mixture through a centrifuge at 8 lbs./min. The cumulative shear history was 76,900 and the shear rate was 26,600 sec.$^{-1}$. The percent cholesterol removed: 76.5% based on percent removed from egg yolk. The pH of the finished egg product was 5.1. Vinegar acts independently of salt in preventing an oil-in-water emulsion at an oil to yolk ratio of 1.1:1.

TABLE 9

| | TEMPERATURE HISTORY | | |
|---|---|---|---|
| Time (min.) | 659* (°F.) | 657* (°F.) | 655* (°F.) |
| 0 | 122 | 124 | 124 |
| 5 | 136 | 122 | 139 |
| 10 | 138 | 124 | 141 |

TABLE 9-continued

| | TEMPERATURE HISTORY | | |
|---|---|---|---|
| Time (min.) | 659* (°F.) | 657* (°F.) | 655* (°F.) |
| 14 | 138 | 124 | 141 |

*659, 657 and 655 are further illustrated in FIG. 1.

EXAMPLE 14 water+vinegar, then add oil, then add 10% salted egg yolk; at a ratio of 1.1:1:0.37:0.019 of oil:yolk:water:vinegar, where the ratio was based upon unsalted egg yolk.

30 lbs. of soybean oil were placed into a jacketed tank and were preheated to a temperature of 145° F. To increase the heating rate, the oil was preheated with a Pentax mixer running at 3600 RPM. While preheating the oil, 0.5 lbs. of vinegar was mixed with 10 lbs. of water, to form vinegar water. The vinegar water was added to the oil. At 145° F., the Pentax mixer was stopped and the 30 lbs. of egg yolk was added to the mixture. The mixture was circulated at 50 lbs./min. through a process system shown in FIG. 1. The Pentax mixer was cooled through a heat exchanger to maintain the thermocouple 655 between 140° F. and 142° F. The mixer was operated at 3600 RPM and the system operated for 14.2 min. or the equivalent of 10 passes. The egg/water was separated from the oil by pumping the sheared mixture through a centrifuge at 8 lbs./min. The cumulative shear history was 76,900 and the shear rate was 26,600 sec.$^{-1}$. The percent cholesterol removed: 72.8% based on percent removed from egg yolk. The pH of the finished egg product: 5.4. A reduction in vinegar by ½ from the Example above did not cause the formation of an oil-in-water emulsion at an oil to yolk ratio of 1.1:1.

TABLE 10

| | TEMPERATURE HISTORY | | |
|---|---|---|---|
| Time (min.) | 659* (°F.) | 657* (°F.) | 655* (°F.) |
| 0 | 122 | 124 | 124 |
| 5 | 135 | 127 | 143 |
| 10 | 139 | 122 | 141 |
| 14 | 138 | 124 | 141 |

*659, 657 and 655 are further illustrated in FIG. 1.

EXAMPLE 15 water+vinegar+oil, then add 10% salted egg yolk; at a ratio of 1.1:1:0.37:0.009 of oil:yolk:water:vinegar, where the ratio was based upon unsalted egg yolk.

30 lbs. of soybean oil, 10 lbs. of water and 0.25 lbs. of vinegar were placed into a jacketed tank and were preheated to a temperature of 145° F. To increase the heating rate, the blend was preheated with a Pentax mixer running at 3600 RPM. At 145° F., the Pentax mixer was stopped and 30 lbs. of salted egg yolk were added to the preheated blend. The salted egg yolk was previously prepared by admixing 3 lbs. of salt with the egg yolk. The mixture was circulated at 50 lbs./min. through a process system shown in FIG. 1. The Pentax mixer was cooled through a heat exchanger to maintain the thermocouple 655 between 140° F. and 142° F. The mixer was operated at 3600 RPM and the system operated for 14.05 min. or the equivalent of 10 passes. The egg/water was separated from the oil by pumping the sheared mixture through a centrifuge at 8 lbs./min. The cumulative shear history was 76,900 and the shear rate was 26,600 sec.$^{-1}$. The percent cholesterol removed: 72% based on percent removed from egg yolk. The pH of the finished egg product was 6.1.

TABLE 11

| | TEMPERATURE HISTORY | | |
|---|---|---|---|
| Time (min.) | 659* (°F.) | 657* (°F.) | 655* (°F.) |
| 0 | 119 | 126 | 125 |
| 5 | 134 | 122 | 139 |
| 10 | 136 | 123 | 140 |
| 14 | 137 | 122 | 140 |

*659, 657 and 655 are further illustrated in FIG. 1.

EXAMPLE 16 water+vinegar+oil, then add 10% salted egg yolk; at a ratio of 1.1:1:0.37:0.0048 of oil:yolk:water:vinegar, where the ratio was based upon unsalted egg yolk.

30 lbs. of soybean oil, 10 lbs. of water and 0.13 lbs. of vinegar were placed into a jacketed tank and were preheated to a temperature of 145° F. To increase the heating rate, the blend was preheated with a Pentax mixer running at 3600 RPM. At 145° F., the Pentax mixer was stopped and 30 lbs. of salted egg yolk were added to the preheated blend. The salted egg yolk was previously prepared by admixing 3 lbs. of salt with the egg yolk. The mixture was circulated at 50 lbs./min. through a process system shown in FIG. 1. The Pentax mixer was cooled through a heat exchanger to maintain the thermocouple 655 between 140° F. and 142° F. The mixer was operated at 3600 RPM and the system operated for 14.05 min. or the equivalent of 10 passes. The egg/water was separated from the oil by pumping the sheared mixture through a centrifuge at 8 lbs./min. The cumulative shear history was 76,900 and the shear rate was 26,600 sec.$^{-1}$. The percent cholesterol removed: 70.6% based on percent removed from egg yolk. The pH of the finished egg product was 6.4.

TABLE 12

| | TEMPERATURE HISTORY | | |
|---|---|---|---|
| Time (min.) | 659* (°F.) | 657* (°F.) | 655* (°F.) |
| 0 | 116 | 124 | 124 |
| 5 | 132 | 122 | 140 |
| 10 | 136 | 120 | 139 |
| 14 | 136 | 120 | 138 |

*659, 657 and 655 are further illustrated in FIG. 1.

EXAMPLE 17—COMPARATIVE ORDER OF ADDITION water+vinegar, then add 10% salted egg yolk, then add oil; at a ratio of 1.1:1:0.37:0.031 oil:yolk:water:vinegar, where the ratio was based upon unsalted egg yolk.

30 lbs. of soybean oil were placed into a jacketed tank and were preheated to a temperature of 145° F. To increase the heating rate, the oil was preheated with a Pentax mixer running at 3600 RPM. While preheating the oil, 0.84 lbs. of vinegar was mixed with 10 lbs. of water, to form a vinegar-water solution. The vinegar-water solution was added to 30 lbs. of salted egg yolks and then mixed together. The salted egg yolks were previously prepared by adding 3 lbs. of salt to the egg yolks. At 145° F., the Pentax mixer was stopped and the diluted egg yolk was added to the preheated soybean oil. The mixture was circulated at 50 lbs./min. through a process system shown in FIG. 1. An oil-in-water emulsion formed immediately upon starting the Pentax mixer at the beginning of the experiment.

EXAMPLE 18 water+salt, added to 10% salted egg yolk, then add oil; at a ratio of 2.2:1.0:0.37:0.39 oil:yolk:water:salt, where the ratio was based upon unsalted egg yolk.

60 lbs. of soybean oil were placed into a jacketed tank and were preheated to a temperature of 145° F. To increase the heating rate, the oil was preheated with a Pentax mixer running at 3600 RPM. While preheating the oil, 7.4 lbs. of salt were dissolved in 10 lbs. of water. The saltwater was added to 30 lbs. of egg yolk and then mixed together. At 145° F., the Pentax mixer was stopped and the diluted egg yolk was added to the preheated soybean oil. The mixture was circulated at 50 lbs./min. through a process system shown in FIG. 1. The Pentax mixer was cooled through a heat exchanger to maintain the thermocouple 655 between 147° F. and 149° F. The mixer was operated at 3600 RPM and the system operated for 18 min., or the equivalent of 10 passes. The egg/water was separated from the oil by pumping the sheared mixture through a centrifuge at 8 lbs./min. The cumulative shear history was 76,900 and the peak shear rate was 26,600 sec.$^{-1}$. The percent cholesterol removed: 79.5% based on percent removed from egg yolk.

What is claimed is:

1. A method of removing cholesterol from egg yolk which comprises combining a food grade acid, salt, water, oil and egg yolk to form a mixture, wherein the mixture contains a ratio in a range of between about 2.4:1 to about 1:1 oil to yolk and a ratio in a range of between about 0.30:0.14:0.003 to about 0.70:0.45:0.56 water:salt:food grade acid, based upon 1.0 part of egg yolk, shearing said mixture without forming an emulsion and centrifuging the mixture to separate the mixture into a first and a second stream, where the first stream contains the egg yolk, salt, food grade acid and water and the second stream contains oil and cholesterol.

2. The method in claim 1, wherein the ratio of water:salt:food grade acid is in the range of between about 0.35:0.19:0.004 to about 0.60:0.29:0.011, based upon the weight of the unsalted egg yolk.

3. The method of claim 2, wherein the egg yolk is a frozen egg yolk and is thawed prior to the addition of the food grade acid, water, salt and oil.

4. The method of claim 2, wherein the egg yolk is a dehydrated egg yolk that is hydrated with water prior to the addition of the food grade acid, water, salt and oil.

5. The method of claim 1, wherein the egg yolk is a salted egg yolk containing between about 8% to about 10% salt, by weight, wherein the ratio of water:salt:food grade acid is in the range of between about 0.30:0.19:0.004 to about 0.70:0.29:0.011, based upon the weight of the unsalted egg yolk.

6. The method of claim 1, wherein the oil is selected from the group consisting of safflower oil, corn oil, sunflower oil, soybean oil, canola oil, olive oil, peanut oil, and mixtures thereof.

7. The method of claim 2, wherein the oil is soybean oil.

8. The method of claim 1, wherein the food grade acid is selected from the group consisting of acetic acid, phosphoric acid and ascorbic acid.

9. The method of claim 1, wherein the oil is preheated between about 125° to about 155° F., and is added to the water, food grade acid and salt.

10. The method of claim 9, wherein the oil is preheated between about 140° to about 145° F.

11. The method of claim 10, wherein the preheated oil is combined with a mixture containing salt, food grade acid and water.

12. The method of claim 1, wherein the mixture is sheared at about 3000 to about 4000 RPM for between about 8 to about 12 equivalent passes.

13. The method of claim 12, wherein the mixture is sheared at about 3500 to about 3700 RPM for between about 9 to about 10 equivalent passes.

14. The method of claim 12, wherein the mixture is sheared at a temperature between about 135° to about 149° F.

15. The method of claim 14, wherein the mixture is sheared at a temperature between about 144° to about 146° F.

16. The method of claim 1, wherein about 70% to about 82% by weight of the cholesterol is removed from the egg yolk.

17. The method of claim 1, wherein the shear history is between about 52,600 about 125,000, with a peak shear rate of between about 17,000 to about 30,300 sec$^{-1}$.

18. The method of claim 17, wherein the shear history is between about 61,300 to about 92,200 and has a peak shear rate of between about 25,000 to about 28,100 sec$^{-1}$.

19. A method of removing cholesterol from egg yolk which comprises combining a food grade acid, water, and oil to egg yolk to form a mixture, where the ratio of oil:yolk is in a range of between about 2.4:1 to about 1:1 and the ratio of water:food grade acid is in a range of between about 0.30:0.003 to about 0.70:0.040, based upon 1 part unsalted egg yolk, shearing said mixture without forming an emulsion and centrifuging the mixture to separate the mixture into a first and a second stream, where the first stream contains the egg yolk, food grade acid, and water and the second stream contains oil and cholesterol, wherein the food grade acid is combined with the oil prior to combining with the egg yolk.

20. The method in claim 19, wherein the ratio of water:food grade acid in the mixture is a ratio in the range of between about 0.35:0.004 to about 0.60:0.011, based upon the weight of the unsalted egg yolk.

21. The method of claim 20, wherein the oil is selected from the group consisting of safflower oil, corn oil, sunflower, oil soybean oil, canola oil, olive oil, peanut oil, and mixtures thereof.

22. The method of claim 20, wherein the oil is soybean oil.

23. The method of claim 19, wherein the food grade acid is selected from the group consisting of acetic acid, phosphoric acid and ascorbic acid.

24. The method of claim 19, wherein the oil is preheated between about 125° to about 155° F., and is added to the water and food grade acid.

25. The method of claim 24, wherein the oil is preheated between about 140° to about 145° F., and is added to the water and food grade acid.

26. The method of claim 19, wherein the mixture is sheared at about 3000 to about 4000 RPM for between about 8 to about 12 equivalent passes.

27. The method of claim 26, wherein the mixture is sheared at about 3500 to about 3700 RPM for between about 9 to about 10 equivalent passes.

28. The method of claim 26, wherein the mixture is sheared at a temperature between about 135° to about 149° F.

29. The method of claim 26, wherein the mixture is sheared at a temperature between about 147° to about 149° F.

30. The method of claim 19, wherein the shear history is between about 52,600 about 125,000, with a peak shear rate of between about 17,000 to about 30,300 sec$^{-1}$.

31. The method of claim 30, wherein the shear history is between about 61,300 to about 92,200 and has a peak shear rate of between about 25,000 to about 28,100 sec$^{-1}$.

32. The method of claim 19, wherein about 70% to about 82% by weight of the cholesterol is removed from the egg yolk.

* * * * *